Figure 1:
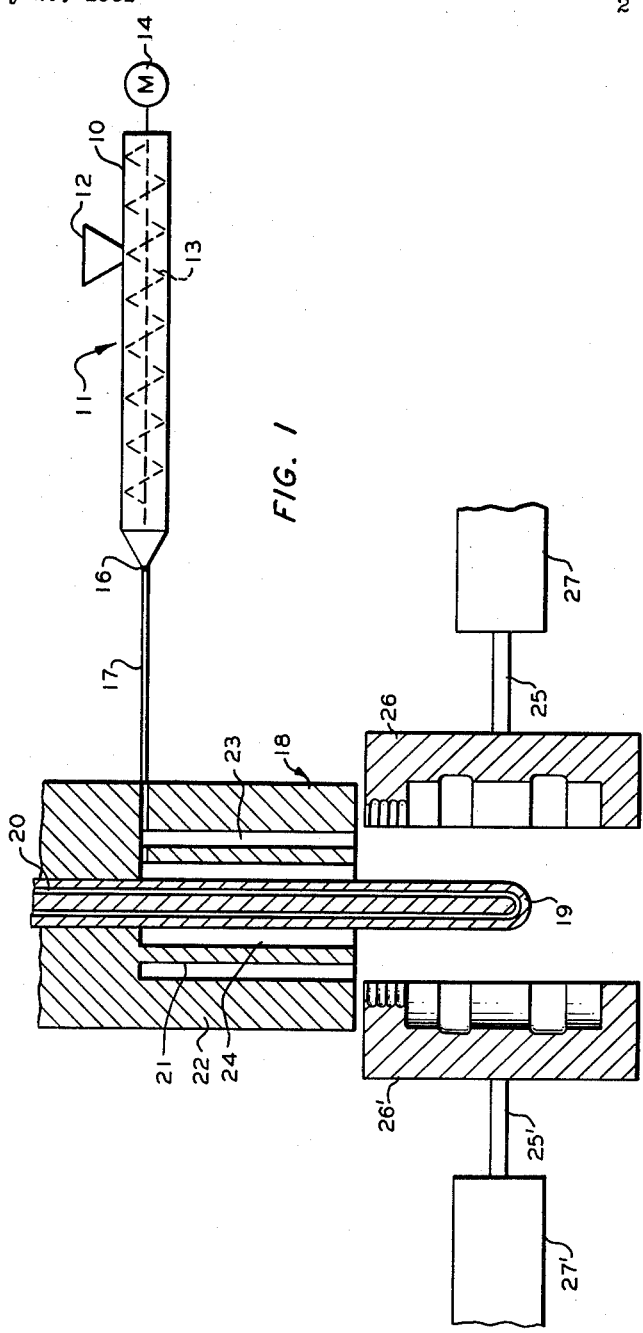

INVENTORS
T. J. NAVE
J. E. HAVELY
BY
Hudson & Young
ATTORNEYS

Sept. 10, 1963  T. J. NAVE ET AL  3,103,036
METHOD AND APPARATUS FOR PRODUCING DOUBLE-WALLED CONTAINERS
Filed May 29, 1961  2 Sheets-Sheet 2

INVENTORS
T.J. NAVE
J.E. HAVELY
BY
ATTORNEYS

United States Patent Office 3,103,036
Patented Sept. 10, 1963

3,103,036
METHOD AND APPARATUS FOR PRODUCING DOUBLE-WALLED CONTAINERS
Thomas J. Nave and John E. Havely, Bartlesville, Okla., assignors to Phillips Petroleum Company, a corporation of Delaware
Filed May 29, 1961, Ser. No. 121,285
5 Claims. (Cl. 18—5)

This invention relates to extrusion of plastic materials. More particularly, this invention relates to a method and apparatus for providing blown double-walled plastic items. One aspect of this invention relates to formation of double-walled items by simultaneous extrusion of two parisons. Another aspect of this invention relates to a method of forming items having external and internal wall members of different and varying shapes with respect to each other. Another aspect of this invention relates to a method for providing gaseous insulation for double-walled plastic items. Another aspect of the invention relates to the providing of novel apparatus for concurrent extrusion of two parisons.

Thus, it is an object of this invention to provide an improved method for forming plastic items. Another object of this invention is to provide novel apparatus for concurrent extrusion of parisons for forming double-walled plastic items. A further object of this invention is to provide a method of producing a double-walled, spaced container in a single integral operation.

Other aspects, objects, and the several advantages of this invention will be apparent from a study of this disclosure, the drawings and the appended claims.

The most common form of double-walled containers is utilized for heat-insulating purposes and comprises an outer container wall which surrounds and is spaced from an inner container wall, the inner container wall being utilized to receive the material for which temperature maintenance is desired. While, commonly, the air space between such inner and outer container walls provides adequate heat-insulating properties, such space may also be filled with well-known forms of heat-insulating materials.

In the past, double-walled plastic containers have been produced by several techniques. Such containers have spaced apart double walls which serve as insulation volume therebetween. One such method of producing such containers has been to form a hollow container by the well-known blow molding technique, then forming a larger hollow container in part, and then heat sealing the parts of the larger container together around the smaller container. Also a technique utilizing the entire blow molding methods has been used in which a first parison is formed into a container and subsequently a second parison is extruded into said previously-formed container and shaped into the same form. These known methods require several different steps in producing the double-wall containers having the walls spaced apart.

We have now found that such double-walled items can be readily formed by concurrently extruding two parisons, one within the other. More specifically, we have now discovered an improved method and apparatus whereby an inner parison is shaped about a mandrel while, at the same time, the outer parison is blown to the shape of the mold.

All plastic materials which lend themselves to extrusion from a melt are applicable to this invention. Such materials comprise the polymers of mono-1-olefins. These polymers may be homopolymers such as polyethylene and polypropylene, copolymers such as ethylene-butene-1 copolymers, or blends of such polymers. In addition, materials such as polyvinyl chloride and polystyrene are applicable.

The cooling medium supplied to the cooling channel within the internal mandrel of the die, as shown in FIGURE 1, item 20, should be intermittent so that the mandrel will not be cooling during the extrusion step. Also, the cooling channel should be insulated within the internal mandrel portion forming part of the die so that same would not be cooled.

Figure 2:
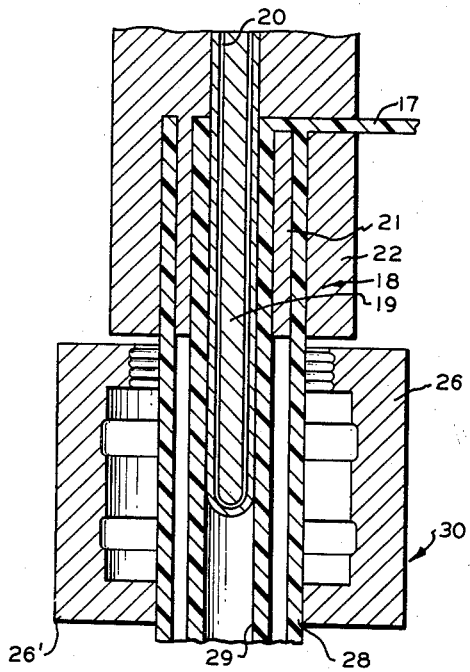
Figure 3:
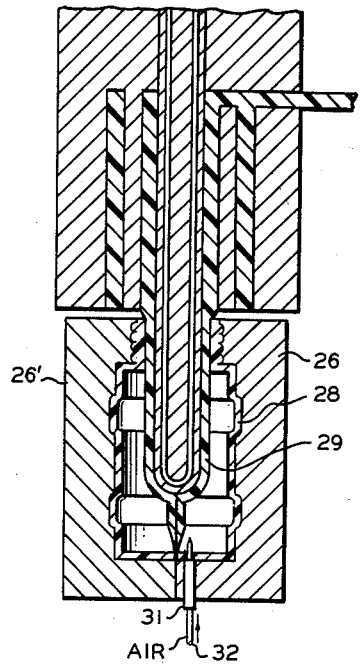
Figure 4:
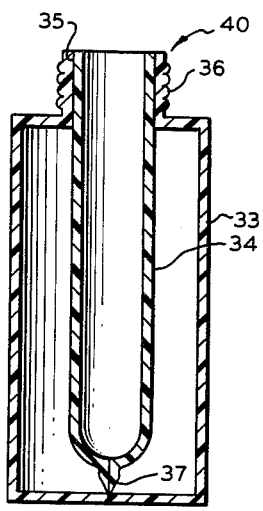
Figure 5:
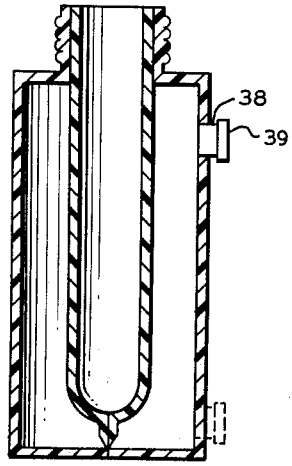

The schematic drawings are sectional views, wherein like parts have been designated with like reference numerals, of which FIGURE 1 is a view of the pertinent apparatus of this invention; FIGURE 2 shows the apparatus in operation with the concentric parisons extruded; FIGURE 3 shows the mold closed and a double-walled container formed therein; FIGURE 4 shows a double-walled container formed by this invention; and FIGURE 5 shows a modified double-walled container formed by this invention.

Referring now to FIGURE 1, plasticating means 11 is shown as an extruder comprising hollow cylinder 10, screw 13 axially aligned within said cylinder, motor 14 connected to said screw 13 for rotating same, feed hopper 12, and outlet 16 and conduit 17. Parison die 18 comprises inner mandrel 19 having cooling channel 20 therein, outer mandrel 21 concentrically disposed about mandrel 19 forming inner annular area 24, outer member 22 concentrically disposed about mandrel 21 forming outer annular area 23. Mold 30 positioned in alignment directly under die 18 comprises movable halves 26 and 26'. Said mold halves are operated by connecting rods 25 and 25' and air cylinder 27 and 27'.

In FIGURE 2, the apparatus is in operation, parisons 28 and 29 extruded from annular areas 23 and 24, respectively, of die 18. Said parisons are extruded between open mold halves 26 and 26'. Likewise, in FIGURE 3, mold halves 26 and 26' have been closed around said parisons and same formed into a double-walled container. Air from a source not shown is introduced through conduit 32 and needle valve 31 between said parisons 28 and 29.

FIGURE 4 shows a bottle 40 formed by this invention comprising inner wall 34, outer wall 33, and threads 36. Said inner and outer walls are connected at the neck section by seal 35 and at the base by member 37.

FIGURE 5 shows the bottle of FIGURE 4 having conduit means 38 covered by cap 39 through outer wall 33.

Example

In operation, plastic pellets are fed to an extruder wherein they are worked into a molten state and then forced into a die having an internal and an external mandrel so that two parisons are extruded simultaneously, one within the other. A mold is then clamped around the extruded parisons and air is injected into the space between the parisons to force the outer parison to take the shape of the mold and the inner parison to take the shape of the internal mandrel which extends from the die into the mold cavity. The clamping of the mold seals the lower end of parisons together and fuses the neck portions together.

In this operation, two parisons are extruded at the same time, one within the other. The inner parison is extruded down over a mandrel of the desired shape of the inside. The mold, which is the desired shape of the outer wall, will close pinching off the bottoms of the two parisons and compression welding the parisons at the top between the internal mandrel and the mold. The outer wall will be blown by means of an injected needle. Pressure between the two walls will force the inner wall to take the shape of the internal mandrel. The internal mandrel will be water cooled and will have a slight taper from top to bottom. Besides being welded at the top of the item, there will be an air space between the walls except for a thin web between the bottoms which will keep the inner shape centered. The internal mandrel could also have a vacuum pulled on it to shape the inner wall.

The parisons may be extruded from a common source of resin or from separate different colored sources of resin.

The needle valve injection may be made at any place through the outer or inner parison. If through the inner parison, such means would have to be designed within the mandrel. Also, it is possible that means could be provided in the outer mandrel to inject the expanding medium directly between the two parisons. If the needle valve is injected through the outer parison, it would be desirable to make same through the threads or bottom to conceal that point in the finished item.

If desired, an opening could be provided in the outer wall to allow for the introduction of hot or cold liquid to the space between the two walls during use to improve the insulation therein. Also, an outlet could be provided in the outer wall to allow for the continuous circulation of liquid therethrough to obtain a constant temperature if such is desired, i.e., if the blown item was used in a laboratory for experiments, etc. Also, permanent insulation material may be placed between the two walls of the item.

The inner and outer parisons may be of the same material or of different materials having different properties depending upon the desired use of the item. The inner parison could be a flexible conventional polyolefin having good insulation properties and the outer parison could be a tough, strong, rigid material.

In carrying out the process of this invention, it will be obvious to one skilled in the art that various shapes may be obtained both for the internal and external walls by altering the shape of the outer mold or inner mandrel.

While cooling of the inner parison has been illustrated by water cooling, other methods of cooling may be employed and are contemplated within the scope of this invention. Thus, easily vaporizable liquids may be used, such as carbon tetrachloride. Mixtures of coolants, such as air and water may also be used.

Blowing of the outer parison may be achieved by the use of air under pressure as illustrated or by the use of inert gases. Such gases will serve to insulate the annulus formed by the two parisons.

Reasonable variation and modification are possible within the scope of the disclosure, the drawings and the appended claims, the essence of which is that there are provided method and apparatus for blow molding a double-walled plastic item in one operation which comprises extruding two parisons simultaneously, the inner parison being extruded over a mandrel, closing the mold around the parisons and mandrel, blowing the outer parison to the shape of the mold and thereby causing the inner parison to take the shape of the mandrel.

We claim:

1. Apparatus for forming double-walled plastic items which comprises, in combination, plasticating means, parison die means which comprise a first inner mandrel provided with a cooling channel therein so adapted as to cool said mandrel, a second inner mandrel concentrically disposed about said first inner mandrel so as to form an inner annular area, an outer mandrel concentrically disposed about said second inner mandrel so as to form an outer annular area, said first inner mandrel extending into the cavity of said molding means, mold cavity means, said plasticating means communicating with said first and second annular areas adjacent said parison die means, said annular areas being adapted to direct annular flow of plastic material into said mold cavity means, said mold cavity means being positioned in alignment with said parison die means, and means communicating with said molding means to apply fluid pressure in said molding means between said inner and outer annular areas.

2. A method of forming fluid insulated double-walled items which comprises the steps of (a) extruding an inner parison over a mandrel and simultaneously extruding an outer parison about and spaced from said inner parison so as to provide one within the other; (b) closing a molding means around said parisons; and (c) injecting fluid into the space between said parisons so as to blow simultaneously said outer parison and inner parison to its desired form.

3. The method of claim 2 wherein the parisons are formed from the same plastic material.

4. The method of claim 2 wherein said inner and outer parisons are formed from different sources of plastic material.

5. The method of claim 2 wherein the liquid pressure is supplied by air.

References Cited in the file of this patent

UNITED STATES PATENTS

| | | |
|---|---|---|
| 2,750,625 | Colombo | June 19, 1956 |
| 2,861,295 | Hagen et al. | Nov. 25, 1958 |

FOREIGN PATENTS

| | | |
|---|---|---|
| 1,016,415 | France | Nov. 12, 1952 |
| 1,106,628 | France | Dec. 21, 1955 |
| 603,517 | Canada | Aug. 16, 1955 |